United States Patent
Lin et al.

(10) Patent No.: US 10,644,844 B1
(45) Date of Patent: May 5, 2020

(54) CIRCUIT FOR AND METHOD OF DETERMINING ERROR SPACING IN AN INPUT SIGNAL

(71) Applicant: Xilinx, Inc., San Jose, CA (US)

(72) Inventors: Winson Lin, Daly City, CA (US); Hongtao Zhang, San Jose, CA (US); Yu Xu, Palo Alto, CA (US); Geoffrey Zhang, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 40 days.

(21) Appl. No.: 15/480,207

(22) Filed: Apr. 5, 2017

(51) Int. Cl.
*H04L 1/20* (2006.01)
*H04L 1/00* (2006.01)

(52) U.S. Cl.
CPC ........... *H04L 1/203* (2013.01); *H04L 1/0045* (2013.01)

(58) Field of Classification Search
CPC .......................... H04L 1/203; G01R 31/3171
See application file for complete search history.

(56) References Cited

U.S. PATENT DOCUMENTS

| | | | | |
|---|---|---|---|---|
| 3,596,065 A * | 7/1971 | Lazarchick, Jr. | ....... | G06F 17/18 377/27 |
| 4,019,040 A * | 4/1977 | Thompson | ............ | G01R 13/22 358/1.15 |
| 4,847,612 A * | 7/1989 | Kaplinsky | ........ | H03K 19/17704 326/10 |
| 5,414,713 A * | 5/1995 | Waschura | ............... | H04L 43/50 714/715 |
| 5,835,500 A * | 11/1998 | Schiller | .................. | G11B 20/18 714/704 |
| 5,937,005 A * | 8/1999 | Obuchi | ................ | H04B 17/309 375/224 |
| 6,021,159 A * | 2/2000 | Nakagawa | ............ | H04B 17/26 329/309 |
| 6,647,518 B1 * | 11/2003 | Asmanis | ................ | H04L 1/203 714/707 |
| 6,675,340 B1 * | 1/2004 | Hardie | ................. | H04L 1/0009 714/751 |
| 6,704,516 B1 * | 3/2004 | Dorsey | ................. | H04B 10/11 398/130 |
| 6,988,227 B1 * | 1/2006 | Perrott | .................... | H04L 1/205 375/327 |
| 7,440,530 B1 | 10/2008 | Ballantyne | | |
| 7,539,926 B1 | 5/2009 | Lesea | | |
| 7,559,011 B1 | 7/2009 | Edwards | | |
| 8,516,339 B1 | 8/2013 | Lesea et al. | | |
| 8,548,071 B2 | 10/2013 | Collins | | |
| 8,930,787 B1 | 1/2015 | Jones et al. | | |
| 9,483,340 B1 * | 11/2016 | Johnson | .................. | H04L 1/203 |
| 2002/0147947 A1 * | 10/2002 | Mayweather | ......... | H04L 1/0061 714/704 |
| 2003/0120886 A1 * | 6/2003 | Moller | .................... | G06F 5/065 711/173 |
| 2004/0086034 A1 * | 5/2004 | Jungerman | ............. | H04L 1/203 375/224 |

(Continued)

*Primary Examiner* — Steve N Nguyen
(74) *Attorney, Agent, or Firm* — John J. King

(57) ABSTRACT

A circuit for determining data error spacing in a data transmitter is disclosed. The circuit comprises a counter; encoding logic configured to receive an output of the counter, wherein the encoding circuit enables generating error spacing information; and a storage element configured to receive an output of the encoding logic.

18 Claims, 6 Drawing Sheets

(56) References Cited

U.S. PATENT DOCUMENTS

2004/0120407 A1* 6/2004 Searles .................. H04L 1/242
 375/259
2014/0281763 A1* 9/2014 Ran ........................ H04L 1/203
 714/704
2017/0155440 A1* 6/2017 Sun ...................... H04B 7/0632

* cited by examiner

| Input | out[12] | out[11] | out[10] | out[9:0] | Valid Condition | | Multiplier |
|---|---|---|---|---|---|---|---|
| | | | | | All 0 | Any 1 | |
| Output | 0 | cnt[11] | cnt[10] | cnt[9:0] | cnt[49:20] | - | x1 |
| | 1 | 0 | 0 | cnt[19:0] | cnt[49:20] | cnt[19:12] | x10³ |
| | 1 | 0 | 1 | cnt[29:20] | cnt[49:30] | cnt[29:20] | x10⁶ |
| | 1 | 1 | 0 | cnt[39:30] | cnt[49:40] | cnt[39:30] | x10⁹ |
| | 1 | 1 | 1 | cnt[49:40] | - | cnt[49:40] | x10¹² |

CIRCUIT FOR AND METHOD OF DETERMINING ERROR SPACING IN AN INPUT SIGNAL

TECHNICAL FIELD

The present invention relates generally to integrated circuit devices, and in particular, to a circuit for and a method of determining error spacing in a input signal.

BACKGROUND

A bit error rate (BER) is the conventional metric used to analyze communications systems using probability theory. A conventional BER counter counts the total number of errors per a number of bits sent. Error correction is often performed on a received bitstream. Forward error correction (FEC) is an error correction technique to enable correcting some bits transmitted in a bitstream. Existing techniques to estimate post-FEC BER rely upon obtaining the pre-FEC BER of the received test pattern and apply a statistically estimated number of correctable errors to get the post-FEC BER estimate. Because any number of errors in an m-bit symbol is considered just one error, this technique results in the number of correctable symbol errors in a codeword being highly dependent on the distribution of errors in the received test pattern. The number of symbol errors will affect if a codeword is entirely discarded and hence affect the eventual BER. As the error distribution is dependent on the channel, a method to statistically calculate the post-FEC BER may not be reliable for all channels. A current method is to statistically estimate the post-FEC BER based on the raw BER, which is not accurate because the post-FEC BER can vary significantly depending on the channel.

Accordingly, circuits and methods that generate error spacing information associated with an input stream are beneficial.

SUMMARY OF THE INVENTION

A circuit for determining data error spacing in a data receiver is disclosed. The circuit comprises a counter configured to receive bit errors associated with an input signal; encoding logic configured to receive an output of the counter, wherein the encoding circuit enables generating error spacing information associated with the bit errors; and a storage element configured to receive an output of the encoding logic.

A method of determining data error spacing in a data receiver is also disclosed. The method comprises counting bits between bit errors associated with an input signal; receiving the counts of bits between bit errors associated with the input signal; generating error spacing information based upon the count of bits between bit errors; and storing the error spacing information.

Other features will be recognized from consideration of the Detailed Description and the Claims, which follow.

DETAILED DESCRIPTION

Figure 1:
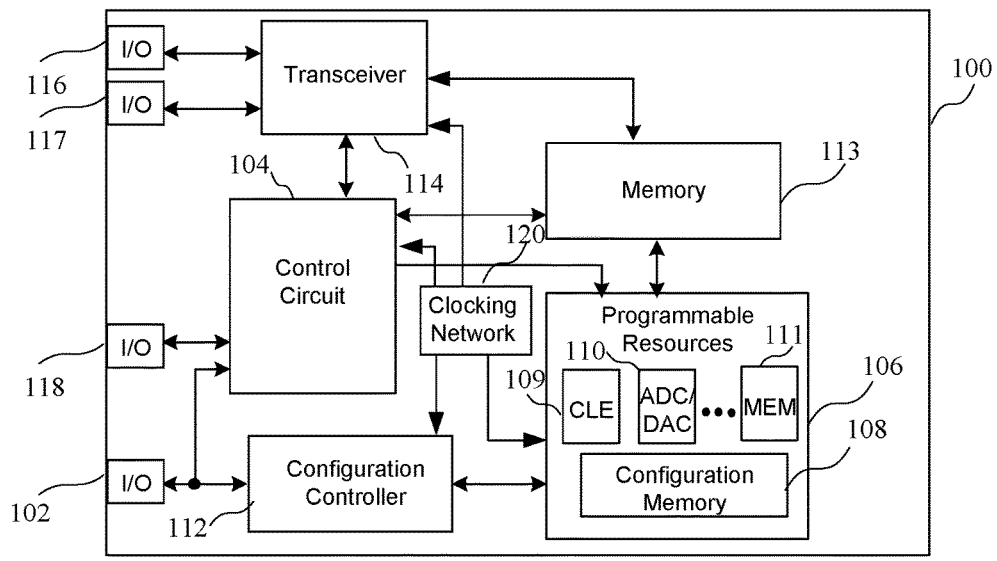
FIG. 1 is a block diagram of an integrated circuit comprising a circuit for transmitting and receiving data.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods set forth below capture the number of cycles between received data errors, where the number of cycles would represent a bit/symbol error spacing. A data error could refer to the bit error at the output of a pattern checker or a symbol error which is a filtered output of a series of bit errors. The error spacing information is compressed and may be transmitted out of the IC for further statistical analysis. The circuits and methods may also provide information of the error distribution over time, and therefore can be used to generate useful statistics for communications system modeling and debugging. Such statistics could include, but are not limited to, a post forward error correction bit error rate, a raw bit error rate, and a bit/symbol error spacing histogram. By providing a compression of error data, the circuits and methods enable an efficient way of bringing bit error spacing information out of a device, such as an IC device for channel modeling and debugging uses.

According to one implementation, a metric captures the number of unit interval (UI) cycles between two consecutive bit/symbol errors, compresses it and sends it out of the IC, such as to a field programmable gate array (FPGA), for further statistical analysis. A bit/symbol error spacing histogram which can be used to derive channel characteristics, such as burst errors versus random errors, may be provided.

Other implementations provide estimates of the post-FEC BER based on the received test pattern. By way of example, the circuits and methods may process m bits to determine a better estimate of the sum of symbol errors within a codeword size. With this estimate, a function is used to calculate the post-FEC BER. Such an estimate is applicable to any forward error correction with an error correcting scheme that sends a codeword of n number of m-bit symbols, out of which n-k are encoding symbols, and can correct up to t errors with any number of errors in each symbol treated as just one error, as will be described in more detail below.

Turning first to FIG. 1, a block diagram of an integrated circuit 100 comprising a circuit for transmitting and receiving data in the integrated circuit is shown. In particular, an input/output port 102 is coupled to a control circuit 104 that controls programmable resources 106 having configuration memory 108 having configurable logic elements 109, analog-to-digital (ADC) and digital-to-analog (DAC) circuit 110, and memory 111. Configuration data may be provided to the configuration memory 108 by a configuration controller 112. The configuration data enables the operation of the programmable resources 106. A memory 113 may be coupled to the control circuit 104 and the programmable resources 106. A transceiver circuit 114 may be coupled to the control circuit 104, programmable resources 106 and the memory 113, and may receive signals at the integrated circuit by way of I/O ports 116 and 117. It should be noted that the transceiver circuit 114 comprises a plurality of differential transmitters and differential transmitters, as described in more detail in the remaining figures. Other I/O ports may be coupled to circuits of the integrated circuit device, such as I/O port 118 that is coupled to the control circuit 104 as shown. A clocking network 120 is coupled to various elements of the circuit of FIG. 1. The circuits and methods set forth below may be implemented using the elements of FIG. 1 or elements of another integrated circuit.

Figure 2:
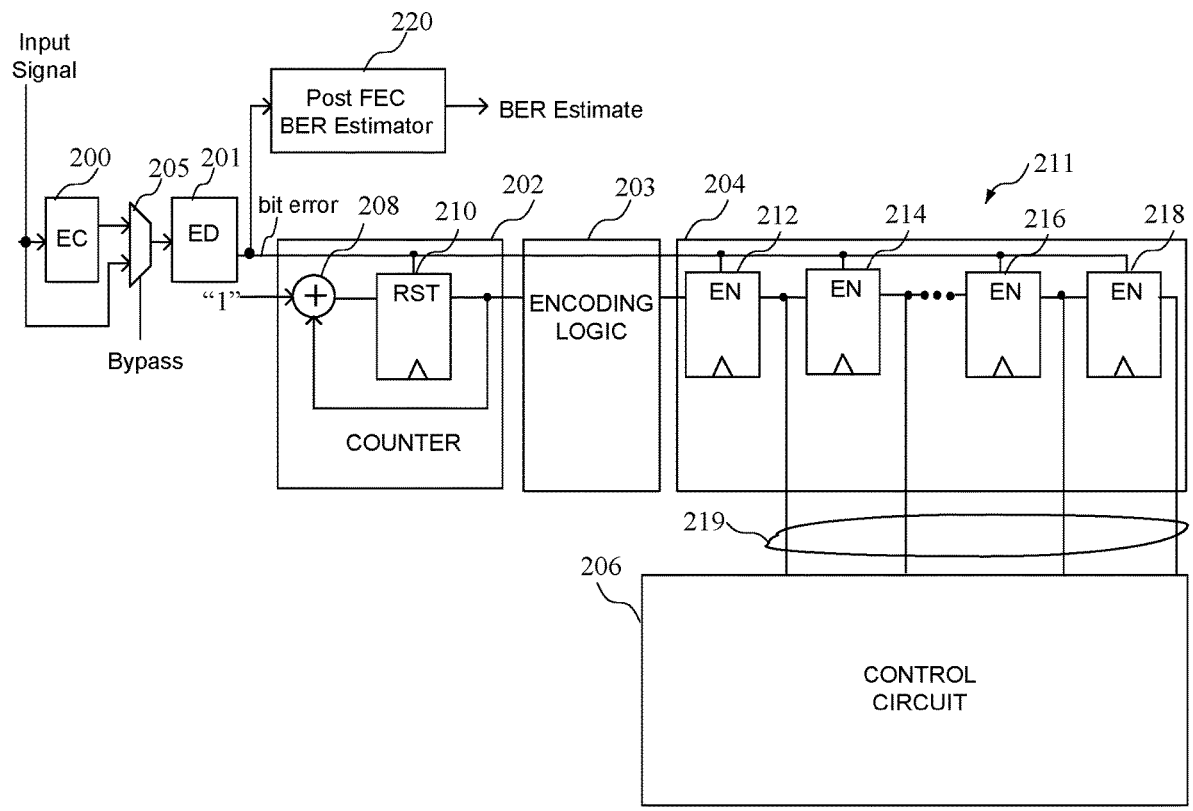
FIG. 2 is a block diagram of a circuit for capturing data error spacing information.

Turning now to FIG. 2, a block diagram of a circuit for capturing data error spacing information is shown. The circuit of FIG. 2 comprises an error correction (EC) circuit 200, such as a forward error correction (FEC) circuit for example, which receives the input signal. An output of the error correction circuit 200 may be coupled to an error detector (ED) 201 configured to generate a bit error signal, where the bit error signal is used to generate data error spacing information. That is, a bypass circuit 205, shown here as a multiplexer configured to receive a Bypass signal at a control terminal, enables bypassing the error correction circuit and providing the input signal to the error detection circuit. Such an arrangement will enable a user to generate bit error data based upon either the input data or error corrected data generated at an output of the error correction circuit 200. The control circuit 206 could use the FEC data through error correction circuit 200 and error detection circuit 201 to determine channel characteristics, such as burst error information. The control circuit 206 could also use non-FEC data through error detection circuit 201 (i.e. data that has bypassed the error detection circuit 201) to evaluate the channel characteristics without FEC. As a result, the control circuit 206 could provide additional information based upon the comparison of the characteristics of the two sets of data, such as the effectiveness of the FEC in reducing burst errors, for example. The error detector may be any type of error detector, such as a pseudorandom binary sequence (PRBS) error detector for example. A counter 202 receives the bit error signal and generates a count representing data error spacing information associated with the received input signal. That is, the count could represent the number of bits between errors for example. An output of the counter is coupled to encoding logic 203, which provides a count which may have a compressed count size that is stored in a storage element 204. The output of the storage element 204 is coupled to a control circuit 206, which may be a Field Programmable Gate Array (FPGA) as will be described in more detail to FIGS. 8 and 9.

The counter 202 comprises a summing circuit 208 coupled to receive the logical "1" signal at a first input and a feedback signal representing a current count from an output of a register 210 at a second input. Therefore, the counter 202 enables counting the number of bit errors associated with an input signal by continuously incrementing the count between bit errors generated by the error detector 201, which are used to reset the register of the counter 202. The encoding logic circuit 203 enables compressing the data to minimize the number of bits used to represent information associated with the error. Reducing the number of bits, and therefore the number of I/O pins of an integrated circuit, can be significant when sending the data outside the integrated circuit by way of I/O pins of the integrated circuit, as will be described in more detail below. According to the implementation of FIG. 2, the storage element 204 comprises a shift register 211 having a plurality of registers 214-218 as shown. An enable (EN) input of each of the resisters 214-218 is coupled to receive the bit error signal indicating the detection of an error, causing the data to be shifted into the shift register. The outputs of each of the registers 214-218 at an output 219 are coupled to the control circuit 206. The data can be processed by the control circuit 206, which could be an FPGA or other programmable logic device as will be described in more detail below.

A Post-FEC BER Estimator 220 is configured to receive the input signal from the error detector 201, and to generate a BER estimate, as will be described in more detail in reference to FIGS. 5 and 6. It should be noted that a pre-FEC BER estimate is used to evaluate how lossy a channel is after all equalization techniques have been applied. It is mostly used as a test feature, to test the channel, to test the effectiveness of the equalization techniques. A post-FEC BER estimate, such as generated by Post-FEC BER estimator 220, is used to provide an insight to how much the FEC could help to improve the BER if a particular FEC if applied to the received data. Therefore, it is possible to quickly get a BER of a channel without implementing the FEC and then apply BER check after FEC has been applied. The Post-FEC BER estimator could also be used to evaluate the effectiveness of various FEC circuits and used as a tool to pick the most optimal FEC circuit. While specific references is made to FEC, it should be understood that circuits and methods could be implemented using other error correction techniques.

More particularly, instead of finding out the bit errors after trying to correct the error with the FEC, it is possible to send a known pattern, such as a PRBS, to determine the bit error signature using a BER estimator, and to estimate the expected BER if FEC had been implemented. This bit error signature will provide the channel characteristics, such as during a testing process. The bit error signature can be determined before the data is transmitted with FEC encoding, while attempting to characterize the channel when building a system targeting that channel, or to quickly debug a channel that could not recover data with FEC encoding. The estimate is useful to test the channel quickly without building a FEC encoder and decoder. By transmitting the PRBS pattern over the channel, it is possible to quickly estimate the post-FEC BER of the channel without implementing FEC. This estimate can be quickly used for system level margin budgeting. Based on the quality of the channel, the estimated BER would be different, and could be used to determine the margin and the choice of FEC.

While the Post-FEC BER estimator 220 is shown separate from the control circuit, it could be implemented as a part of the control circuit 206. Because the Post-FEC BER estimator 220 can operate in real time, it can receive the bit errors directly and does not need to receive the compressed data. Further, it should be noted that the control circuit 206 and the Post FEC BER estimator 220 could be implemented together with the other elements of FIG. 2 on a single chip of an integrated circuit device, different chips of a multi-chip integrated circuit device, or could be distributed among different devices, such as different integrated circuit packages. Further, the circuits and methods could be implemented as a part of test equipment, and distributed between different elements of the test equipment, which may include an integrated circuit, or implemented in one or more integrated circuits separate from the test equipment.

Figures 3, 4:
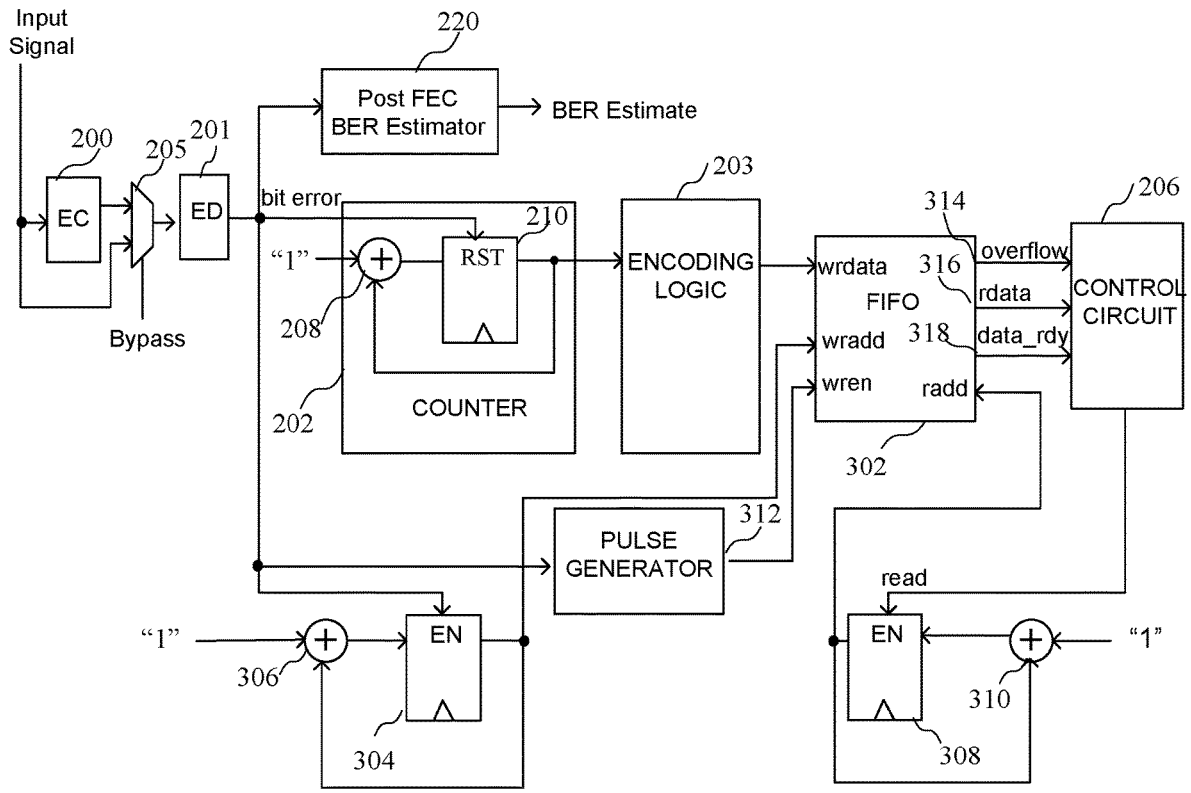
FIG. 3 is a block diagram of another circuit for capturing data error spacing information.
FIG. 4 is an exemplary table enabling reducing a number of output bits generated by a circuit for capturing data error spacing information.

Turning now to FIG. 3, a block diagram of another circuit for capturing data error spacing information is shown. Rather than implementing a shift register, the circuit of FIG. 3 implements a first in, first out (FIFO) circuit 302 and control circuits that generate control signals based upon the bit error signal. The output of the encoding logic is coupled to a write data (wrdata) input of the FIFO 302, and generates data that is provided to the control circuit 206. More particularly, a first register 304 is configured to receive the bit error signal at an enable input. An adder 306 is configured to receive a logical "1" at a first input and an output of the register 304 at a second input. An output of the adder circuit 306 is coupled to a data input of the register 304. A second register 308 is configured to receive a read signal at an enable input. An adder 310 is configured to receive a logical "1" at a first input and an output of the register 308 at a second input. An output of the adder circuit 310 is coupled to a data input of the register 308. A pulse generator 312 receives the bit error signal at the input and generates a pulse output that is coupled to the write enable (wren) input of the FIFO circuit 302.

A count associated with a bit error that controls the register 304 increments a write address is coupled to a write address (wradd) input of the FIFO circuit 302. A second count generated in response to the read signal by the register 308 is a read address and is coupled to the read address (radd) input of the FIFO circuit 302.

Register 304 increments the waddr and toggles a write, while register 308 is enabled by read and is used to generate an incremented read address, which will result in the output data of the FIFO (rdata) to be updated to new data at the rdata output 316. During operation, a bit error or symbol error, depending upon the error detection implemented by error detection 201, will cause the bit error spacing information to be written into the FIFO. Downstream logic, such as the control circuit 206, will toggle the read to read out the data that has been written into the FIFO. If waddr is not greater than raddr, the data has not been written into that read address yet, and hence the data is not ready. Therefore, the downstream logic will wait until the data ready flag goes up before toggling a next read.

The overflow signal generated at an output 314 is to monitor if waddr has caught up with raddr, in which case it would have corrupted the read data (rdata). That is, the overflow signal is a debug/error flag to the downstream block consuming read data (rdata) that it is not reading fast enough. If at any time the overflow signal goes up, the bit error is happening much faster than the read pulse. The overflow condition indicates that the downstream logic should be reading it faster, or that the downstream logic is reading the data at a fixed interval that reflects the maximum bit error rate for the specifications. If the bit error happens any faster than the maximum bit error rate, an overflow signal indicates that the error is too high to pursue any further channel analysis. The rdata signal is the data that was written into FIFO, where the read input to the enable input of the register 308 is generated from the downstream logic that wants to retrieve the error data, which may be bit error data or symbol error data, stored in the FIFO. Each read pulse will generate the next rdata.

A comparison of whether waddr is greater than raddr is performed by the FIFO 302. The comparison is equivalent to an underflow signal indicating whether the reading of data at the output 316 is faster than the waddr is being incremented. If the downstream logic attempts a read and it caused the raddr to exceed the waddr, the data_rdy indicator generated at an output 318 will provide the information whether the data at the address is not ready for consumption. That is, the downstream logic should wait until the waddr is incremented by the bit error signal before consuming the data, and that the data is only valid is when waddr is greater than raddr. While the comparison of wradd and radd as shown is performed by the FIFO, it should be understood the comparison could be performed separately by a comparator outside of the FIFO, where the result would be provided as a control signal to the FIFO.

According to the implementations of FIGS. 2 and 3, a 50-bit counter may be configured to count a number of cycles having no errors, and can capture bit error spacing for up to $10^{-15}$ BER channels. The encoding logic 203 enables compressing the count size, such as from a 50-bit to a 13-bit count size, hence reducing the number of bits for intermediate storage and also saving the number of I/Os to bring the error spacing information out of the chip. A storage device stores consecutive error spacing information, where the depth of the storage may be selected depending on the number of bits processed in one cycle when the data is sent out of the chip.

According to one implementation, compression of the higher value numbers can be achieved by dropping off LSB bits that are insignificant. For example, the difference between 1,000,000 and 1,000,001 is statistically insignificant, while the difference between 1 and 100 is statistically significant. A table of FIG. 4 shows reducing output bits generated by a circuit for capturing a data error spacing signature. The output out [12:0] refers to the final 13-bit encoded value. Valid condition refers to a scenario that the particular input line is valid. The multiplier column shows the scaling on the value of out[9:0]. A reading of 1 in bit 40 indicates an error spacing of $1 \times 2^{40}$ which is approximately $1 \times 10^{12}$. So the bit error rate is approximately $10^{-12}$. A burst of consecutive readings of 1, 1, 1, . . . , 1, indicates burst errors in the channel. Readings of 1, $10^9$, 1, . . . , $10^9$, for example indicates random errors in the channel.

Figure 5:
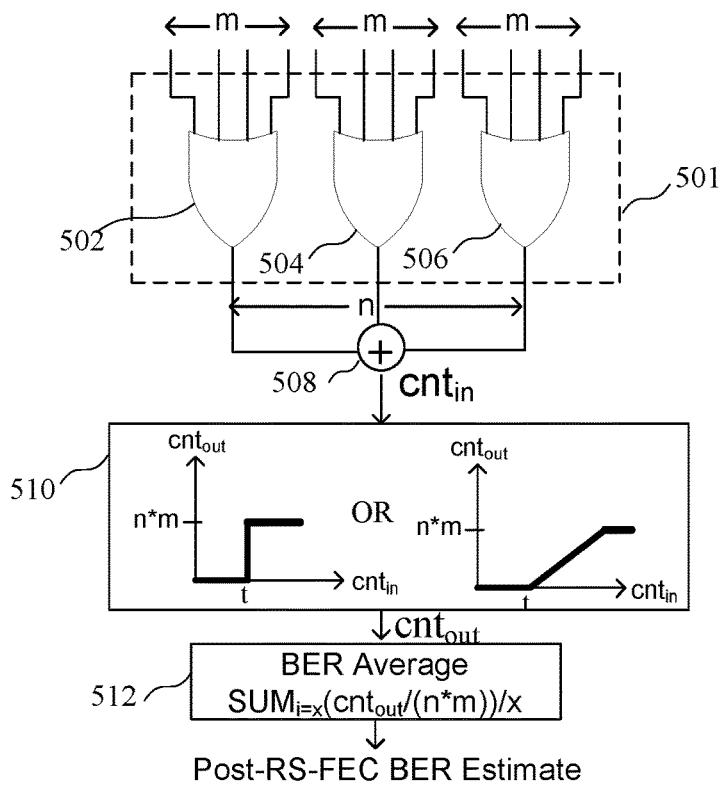
FIG. 5 is a block diagram of a logic circuit of a post-FEC BER estimator.

Turning now to FIG. 5, a block diagram of a logic circuit of a post-FEC BER estimator is shown. The circuit of FIG. 5 comprises an m-bit error filter 501 comprising a plurality of OR gates 502-504, each of which is coupled to receive m bits which are consecutive outputs of the error detector. That is, each of the 12 bits in a logical "1" or "0" representing 12 consecutive bitwise error values. Outputs of the OR gates are coupled to a summing circuit 508, an output of which is an n-bit value coupled to an FEC error estimator circuit 510. An averaging circuit 512 provides a BER average by generating a $SUM_{i=x}((cnt_{out}/(n*m))/x$ where x represents the number of values over which the sum is averaged. An output of averaging circuit 512 represents a post-FEC BER estimate. Alternatively, the averaging circuit could provide a BER average by generating a $SUMi=x (cnt_{out}/(n*m*x))$, which would provide the same result assuming that there are no rounding errors.

The FEC error estimator function of the FEC error estimator circuit 510 shows two functions. The function on the left shows that if the number errors is less than a threshold value t, it is recoverable and there is 0 error, but if it exceeds t, then the whole packet is not recoverable, and there are n*m errors. The function on the right shows a possible modification to the function to allow some flexibility in the estimator around t, so that it is not an all or nothing determination. This is one way to compensate for the fact that it is not known exactly where the starting and ending of each packet is. The second function also represents a generic function that could apply to another error correction technique that might not discard all data if error is more than t.

A Reed-Solomon RS(n, k, t, m) BER estimator is used as an example for illustration, where n is number of symbols in a codeword, k is actual number of data symbols, t is the number of correctable symbols, m is the number of bits in the symbol. The m-bit error filter 501 select m bits from the output of data error checker with random starting boundary, and performs bit-wise OR of bits, where one or more errors equates to one error. It should be noted that the m-bit error filter 501 will account for burst or random errors, and filter out contiguous errors. The n-symbol error summer 508 sums n contiguous outputs from the m-bit error filters, and find the total number of correctable errors in a codeword.

The FEC error estimator circuit 510 determines if the error sum is more than t, in which case the whole codeword is considered to have all errors. Otherwise, it is considered to have no errors. It should be noted that the FEC error function estimator could use a custom function depending on how the system handles uncorrectable blocks. Finally, the averaging circuit 512 determines a sum per codeword BER and takes an average. The process is repeated with different starting boundaries and continuously takes the average. It should be noted that the circuits and methods enable determining the actual codeword boundary just from the stream of bits, and multiple different boundaries could be used to get a statistical mean.

Figure 6:
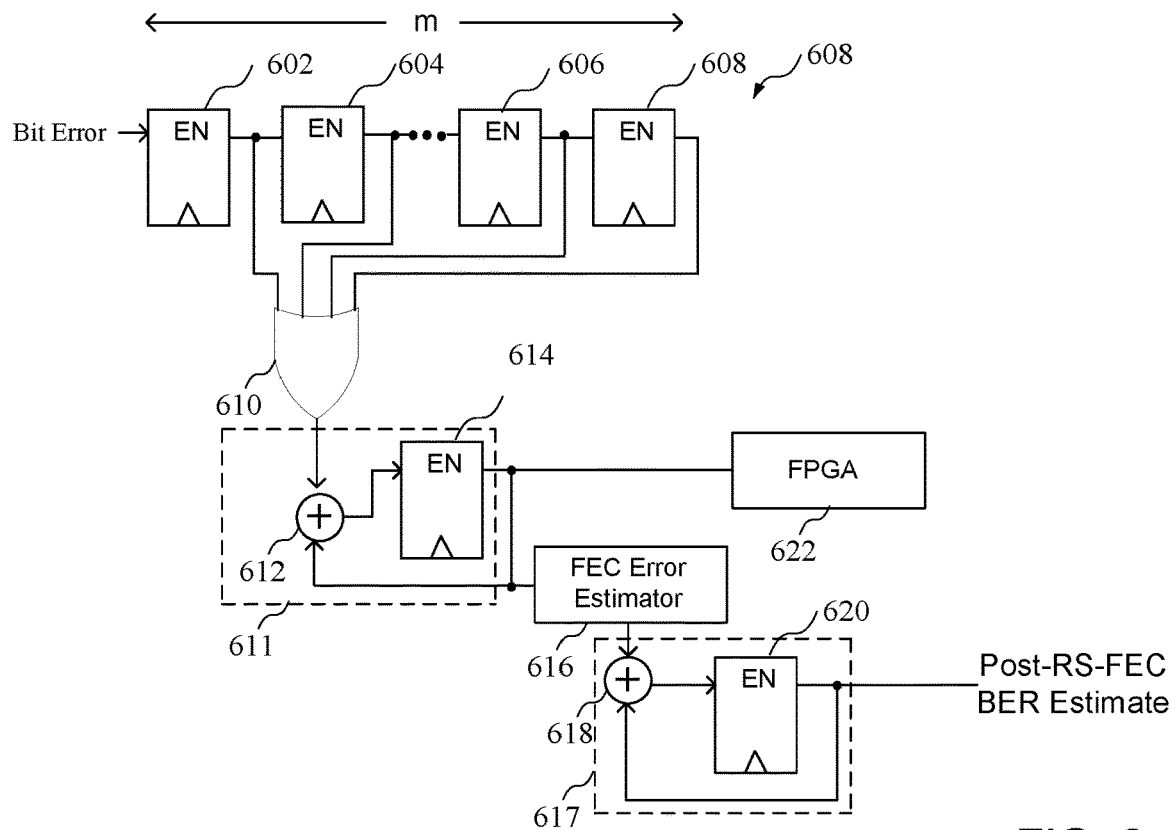
FIG. 6 is block diagram of a circuit for generating a post-FEC BER estimate.

Turning now to FIG. 6, a block diagram of a circuit for generating a post-FEC BER estimate is shown, and may be used to implement the function of FIG. 5. The implementation of FIG. 6 is a diagram of a hardware implementation, requiring m+log 2(n*m)+log 2(n*m*x) registers, where m, n, x could be made programmable. The FEC error estimator function could be customized depending on how the system handles uncorrectable blocks. As shown in FIG. 6, a shift register 601 has a plurality of registers 602-608 that are coupled together, and have outputs coupled to inputs of an OR gate 610. An output of the OR gate 610 is coupled to a counter 611 having a summing circuit 612 and a register circuit 614. The output of the OR gate 610 is coupled to a first input of a summing circuit 612, which also receives a feedback signal from an output of the register 614. The summing circuit 612 and register 614 comprises a counter having a size of n*m*x, and which is updated every m cycles and reset every n*m cycles. The output of the register 614, which is a count between errors, is coupled to an FEC Error Estimator 616, an output of which is coupled to a counter 617 having a summing circuit 618 and a register 620 at circuit 616, where a FEC error estimate is provided to a counter 617 having a first input of the summing circuit 618. The FEC error estimator circuit 616 calculates, for every n*m cycles, if ($cnt_{in}$>t), then $cnt_{out}$=n*m; else $cnt_{out}$=0. A feedback signal from an output of the register 620, which is coupled to an output of the summing circuit 618, is coupled to a second input of the summing circuit 618. An output of the register 620, which generates a post-FEC BER estimate, may be reset every x cycles. Averaging of the x block can be performed using the post RS-FEC BER estimate separately from the circuit of FIG. 6. Optionally, the accumulated value at the output of the register 614 can be brought out to an FPGA 622 or another integrated circuit device for post-processing in place of implementing a separate circuit for the FEC error estimator function of counter 617 and X block averaging. The m-bit error filter could be applied in any situation where it is beneficial to treat burst and random errors in the same way in terms of error count per window.

Figure 7:
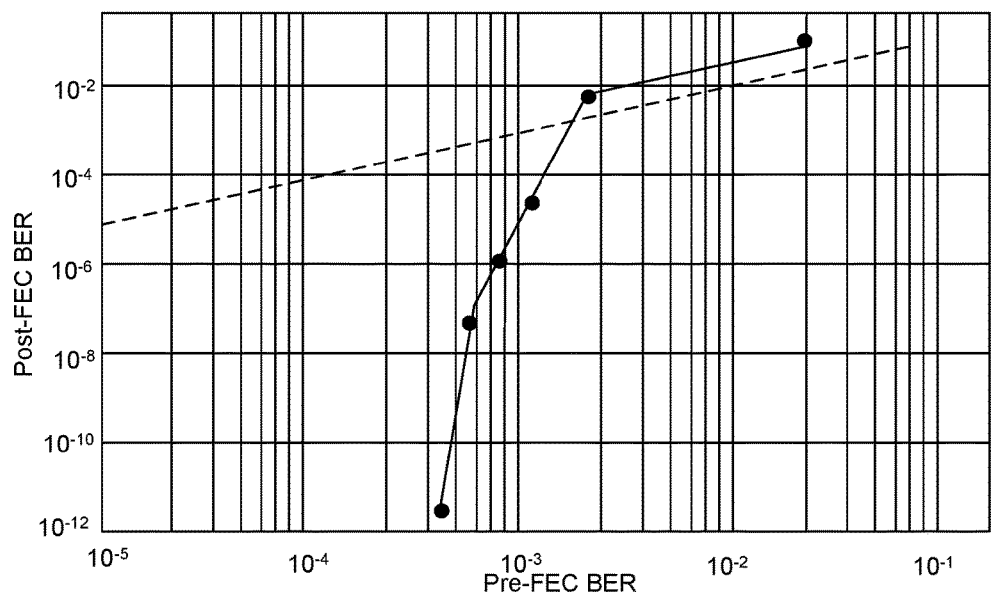
FIG. 7 is a graph showing a pre-FEC BER as a function of post-FEC BER.

Turning now to FIG. 7, a graph shows a pre-FEC BER as a function of post-FEC BER. For example, in a Reed-Solomon error correction circuit, such as RS(544, 514, 15, 10), up to 15 symbol errors can be corrected in each block. For any 10-bit symbol, a symbol error is true if any number of bits is wrong (i.e. 1 bit is wrong or all 10 bits are wrong). If there are more than 15 symbol errors in each codeword, the whole codeword will be treated as wrong. Hence, for a pre-FEC BER=2.757e-2 (150*N/5440*N), the best case post-FEC BER is 0, where every symbol error constitutes 10-bit errors. In a worst case, the post-FEC BER is many times worse than the pre-FEC BER. The graph shows an example of post-FEC versus pre-FEC BER from a simulation of 100M codewords with random errors. The solid line shows the relationship between post-FEC and pre-FEC BER. The dashed line is the identity line where anything above indicates a post-FEC BER that is worse than pre-FEC BER. It should be noted that the solid line would be different for different distribution of errors which is channel dependent.

The graph of FIG. 7 shows that performing FEC is not always beneficial. Points below unity line show how FEC is beneficial and those above show how FEC is not beneficial. Hence it is not obvious that FEC should always be used, or maybe a better FEC could be used. So if the post FEC BER can be estimated, then it is not necessary to actually implement the FEC to determine if that particular FEC is beneficial to the system. It is also possible to use the estimate to perform system level analysis without having to implement the actual FEC. The graph also shows the pre-FEC BER cannot predict what the post-FEC BER would be. Therefore, if a system level analysis is necessary, it would not be possible to rely on the pre-FEC BER and multiply by some factor, because the post-FEC BER, depends on the channel.

Therefore, a reliable way to estimate the post-FEC BER is important when determining if the chosen FEC scheme is effective, and identify the best FEC scheme with the least overhead that meets the post-FEC BER requirement. The circuits and methods are more reliable because they estimate the symbol error based on the received pattern. Therefore, the estimated symbol error will account for any channel characteristics that result in the received pattern. Hence, there is no need to guess the post FEC BER, which is not accurate, or pre-determine (non-trivial) the channel characteristics to derive the post-FEC BER, which is a non-trivial task.

Figure 8:
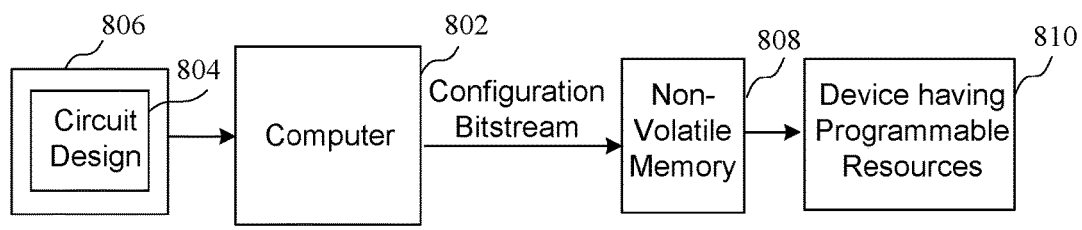
FIG. 8 is a block diagram showing a circuit enabling the configuration of a device having programmable resources.

Turning now to FIG. 8, a block diagram of a system for programming a device having programmable resources according to an embodiment is shown. In particular, a computer 802 is coupled to receive a circuit design 804 from a memory 806, and generates a configuration bitstream that is stored in the non-volatile memory 808. As will be described in more detail below, the circuit design may be a high level design, such as a circuit design defined in a hardware description language (HDL). Also, the computer may be configured to run software that generates a configuration bitstream that is stored in the non-volatile memory 808 and provided to an integrated circuit 810 that may be a programmable integrated circuit, such as the integrated circuit described below in FIG. 9. As will be described in more detail below, bit of the configuration bitstream are used to configure programmable resources of the integrated circuit.

Figure 9:
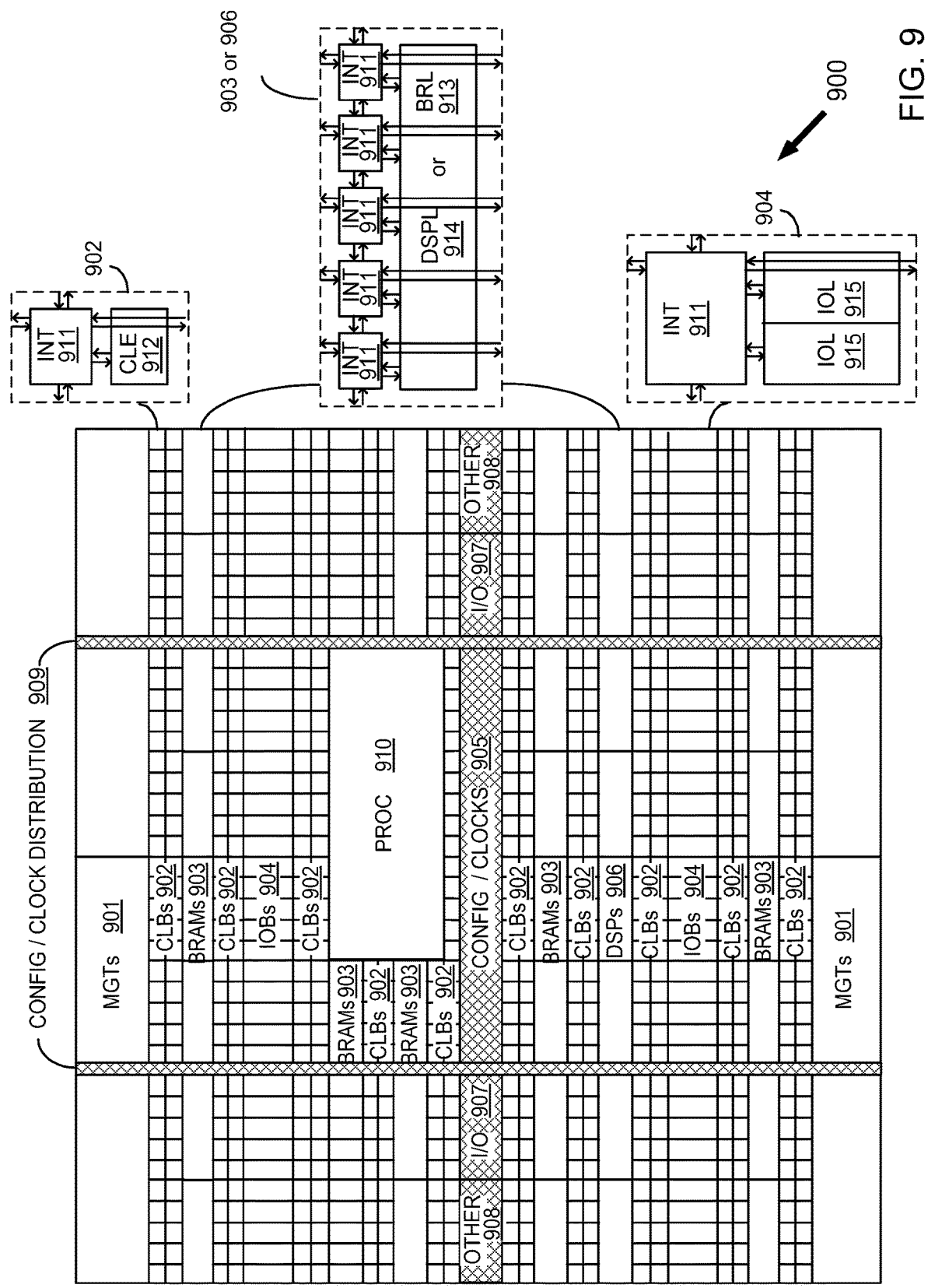
FIG. 9 is a block diagram of a device having programmable resources.

Turning now to FIG. 9, a block diagram of a device having programmable resources including the circuits of FIGS. 1-7 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 9 comprises an FPGA architecture 900 having a large number of different programmable tiles including multi-gigabit transceivers (MGTs) 901, CLBs 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907 (e.g., configuration ports and clock ports), and other programmable logic 908 such as digital clock managers, analog-to-digital converters, system monitoring logic, and so forth. Some FPGAs also include dedicated processor blocks (PROC) 910, which may be used to implement a software application, for example.

In some FPGAs, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA. The programmable interconnect element 911 also includes the connections to and from the programmable logic element within the same tile, as shown by the examples included at the top of FIG. 9.

For example, a CLB 902 may include a configurable logic element (CLE) 912 that may be programmed to implement user logic plus a single programmable interconnect element 911. A BRAM 903 may include a BRAM logic element (BRL) 913 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 906 may include a DSP logic element (DSPL) 914 in addition to an appropriate number of programmable interconnect elements. An 10B 904 may include, for example, two instances of an input/output logic element (IOL) 915 in addition to one instance of the programmable interconnect element 911. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 909 extending from this column are used to distribute the clocks and configuration signals across the breadth of the FPGA. Some FPGAs utilizing the architecture illustrated in FIG. 9 include additional logic blocks that disrupt the regular columnar structure making up a large part of the FPGA. The additional logic blocks may be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear in order to facilitate the efficient implementation of user logic. While the embodiment of FIG. 9 relates to an integrated circuit having programmable resources, it should be understood that the circuits and methods set forth in more detail below could be implemented in any type of ASIC.

Figure 10:
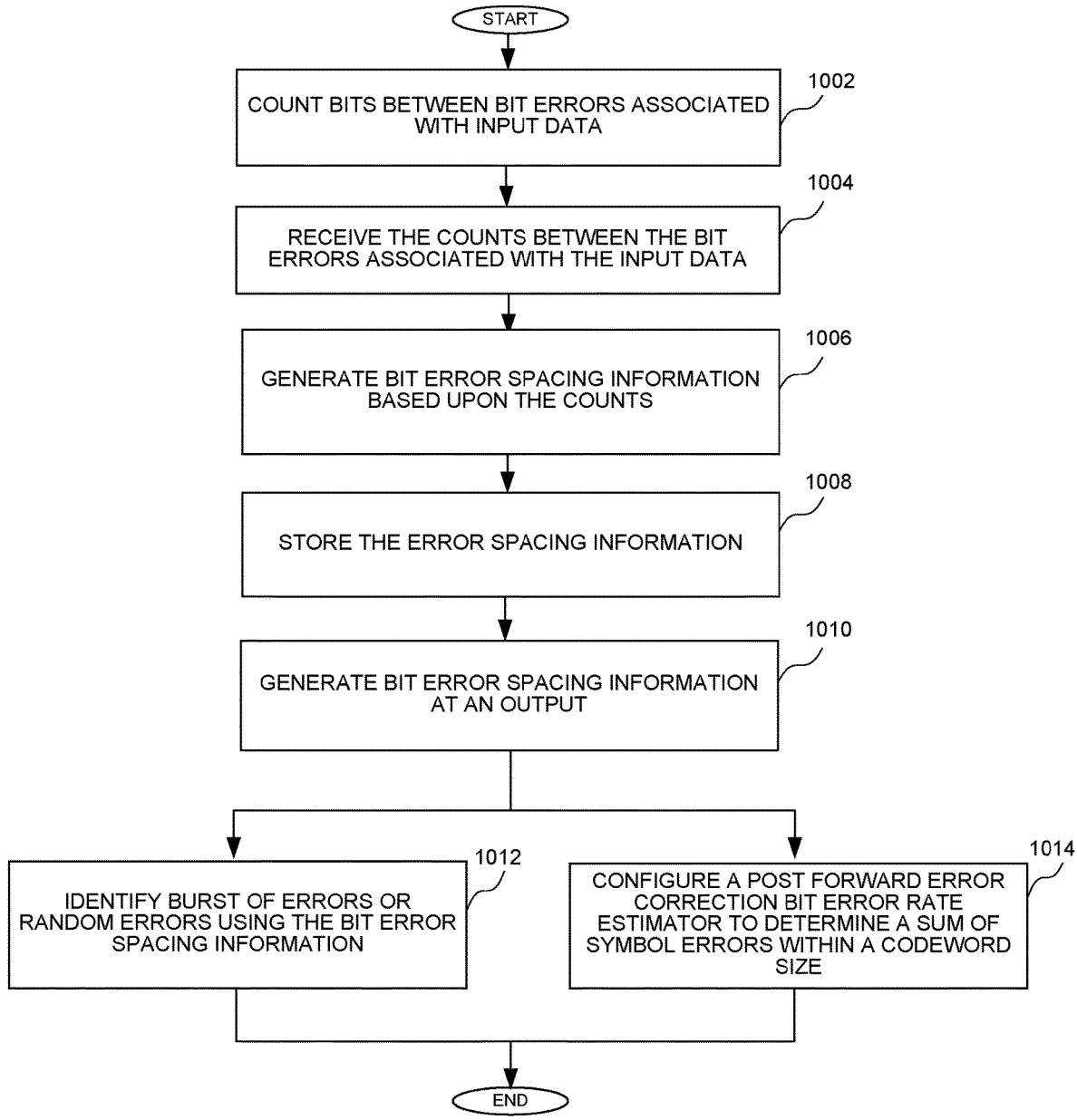
FIG. 10 is a flow chart showing a method of estimating a bit error rate.

Turning now to FIG. 10, a flow chart shows a method of data error spacing in a data transmitter. The method of FIG. 10 could be implemented using the circuits of FIG. 2 or 3 for example, or some other suitable circuit. In particular, bit between errors associated with input data are counted, such as by counter 202, at a block 1002. The counts associated with bit errors of the input data are received at a block 1004. Error spacing information is generated based upon the bit error counts at a block 1006. The error spacing information could represent the number of bits transmitted between errors, as described above. The bit error counts are stored at a block 1008. The bit error counts could be stored in a shift register or a FIFO, as described above in reference to FIGS. 2 and 3. Bit error spacing information generating at an output at a block 1010.

After generating the error spacing information, additional information can be derived for example, burst of errors or random errors could be identified using the bit error spacing information at a block 1012. Also post forward error correction bit error rate estimator, such as Post-FEC BER Estimator 720 for example, may be configured to determine a sum of symbol errors within a codeword size at a block 1014.

It can therefore be appreciated that new to circuits for and methods of determining error spacing in an input signal have been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A circuit for determining data error spacing in a data receiver, the circuit comprising:
   an error correction circuit configured to receive an input signal;
   an error detection circuit configured to receive the input signal and an output of the error correction circuit;
   a counter configured to receive bit errors associated with a selected one of the input signal and the output of the error correction circuit;
   encoding logic configured to receive an output of the counter, wherein the encoding logic enables generating error spacing information associated with the bit errors, and wherein the error spacing information represents a count of bits between consecutive bit errors;
   a storage element configured to receive an output of the encoding logic; and
   a control circuit configured to receive an output of the storage element and to identify both random errors and bursts of errors;
   wherein the control circuit identifies random errors based upon the error spacing information of the selected one of the input signal and the output of the error correction circuit; and
   wherein the control circuit identifies a burst of errors based upon consecutive error spacing information indicating consecutive errors of the selected one of the input signal and the output of the error correction circuit.

2. The circuit of claim 1 wherein the error spacing information comprises data indicating a space between bit errors.

3. The circuit of claim 1 wherein the storage element comprises a shift register.

4. The circuit of claim 3 wherein the control circuit is coupled to an output of the shift register, and the control circuit collects compressed data associated with bit errors.

5. The circuit of claim 1 wherein the storage element comprises a first-in, first-out register.

6. The circuit of claim 1 further comprising a first register configured to receive the bit errors at a first enable input and generate a write address and a second register configured to receive a read input at a second enable input and generate a read address, wherein a comparator configured to receive the write address and the read address determines if the write address is greater than the read address.

7. The circuit of claim 1 further comprising an output for generating the error spacing information, wherein the output is coupled to a programmable logic device.

8. The circuit of claim 1 further comprising a post forward error correction bit error rate estimator configured to determine a sum of symbol errors within a codeword size.

9. The circuit of claim 8 wherein the post forward error correction bit error rate estimator comprises a Reed-Solomon error-correction circuit.

10. A method of determining data error spacing in a data receiver, the method comprising:
    receiving an input signal at an error correction circuit;
    configuring an error detection circuit to receive the input signal and an output of the error correction circuit;
    counting bits between bit errors associated with a selected one of the input signal and the output of the error correction circuit;
    receiving the counts of bits between bit errors associated with the selected one of the input signal and the output of the error correction circuit;
    generating error spacing information based upon the counts of bits between consecutive bit errors to identify both random errors and bursts of errors;
    storing the error spacing information;
    identifying random errors using the error spacing information of the selected one of the input signal and the output of the error correction circuit;
    identifying a burst of errors based upon consecutive error spacing information indicating consecutive errors of the selected one of the input signal and the output of the error correction circuit.

11. The method of claim 10 wherein generating error spacing information comprises generating data indicating a space between bit errors.

12. The method of claim 10 wherein storing the error spacing information comprises storing error spacing information in a shift register.

13. The method of claim 12 further comprising coupling a control circuit to an output of the shift register, wherein the control circuit collects data associated with bit errors.

14. The method of claim 10 wherein storing the counts of bits between bit errors comprises storing the counts of bits between bit errors in a first-in, first-out register.

15. The method of claim 10 further comprising configuring a first register to receive the bit errors at a first enable input and generate a write address and configuring a second register to receive a read input at a second enable input and generate a read address, wherein a comparator configured to receive the write address and the read address determines if the write address is greater than the read address.

16. The method of claim 10 further comprising generating error spacing information at an output, wherein the error spacing information is provided to a programmable logic device.

17. The method of claim 10 further comprising configuring a post forward error correction bit error rate estimator to determine a sum of symbol errors within a codeword size.

18. The method of claim 17 wherein configuring a post forward error correction bit error rate estimator comprises configuring a Reed-Solomon error-correction circuit.

* * * * *